United States Patent [19]
Barz et al.

[11] Patent Number: 6,131,897
[45] Date of Patent: Oct. 17, 2000

[54] STRUCTURAL REINFORCEMENTS

[75] Inventors: William J. Barz, Shelby Township; Michael J. Czaplicki, Rochester, both of Mich.

[73] Assignee: L & L Products, Inc., Romeo, Mich.

[21] Appl. No.: 09/268,810

[22] Filed: Mar. 16, 1999

[51] Int. Cl.[7] .................................................. B25B 1/02

[52] U.S. Cl. .................... 269/207; 52/309.13; 52/309.2; 52/731.2; 269/146.6; 269/901

[58] Field of Search .............................. 52/309.13, 309.2, 52/730.4, 731.2; 269/207, 146.6, 901

[56] References Cited

U.S. PATENT DOCUMENTS

| | | | |
|---|---|---|---|
| 4,984,406 | 1/1991 | Friesen | 52/594 |
| 5,871,849 | 2/1999 | Lepine | 428/542.8 |

*Primary Examiner*—Carl D. Friedman
*Assistant Examiner*—Christy M. Syres
*Attorney, Agent, or Firm*—Dykema Gossett PLLC

[57] ABSTRACT

A composite structural reinforcement has a keyed reinforcement member in which a thermally expandable resin strip is mechanically retained. The mechanical interlock permits the resin to be secured to the member without heat or an adhesive.

20 Claims, 2 Drawing Sheets

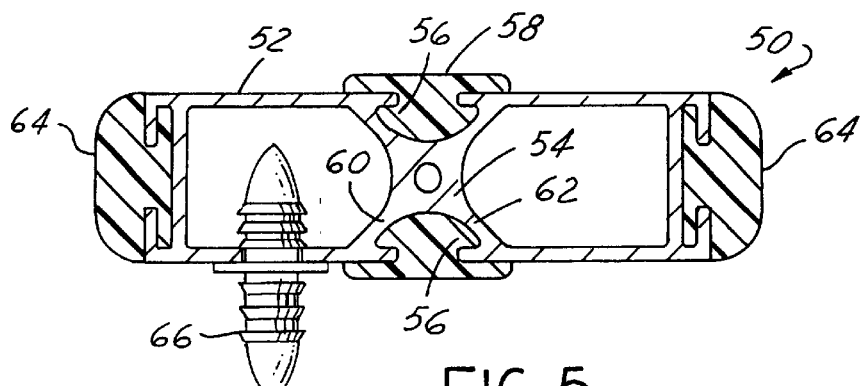
FIG. 5
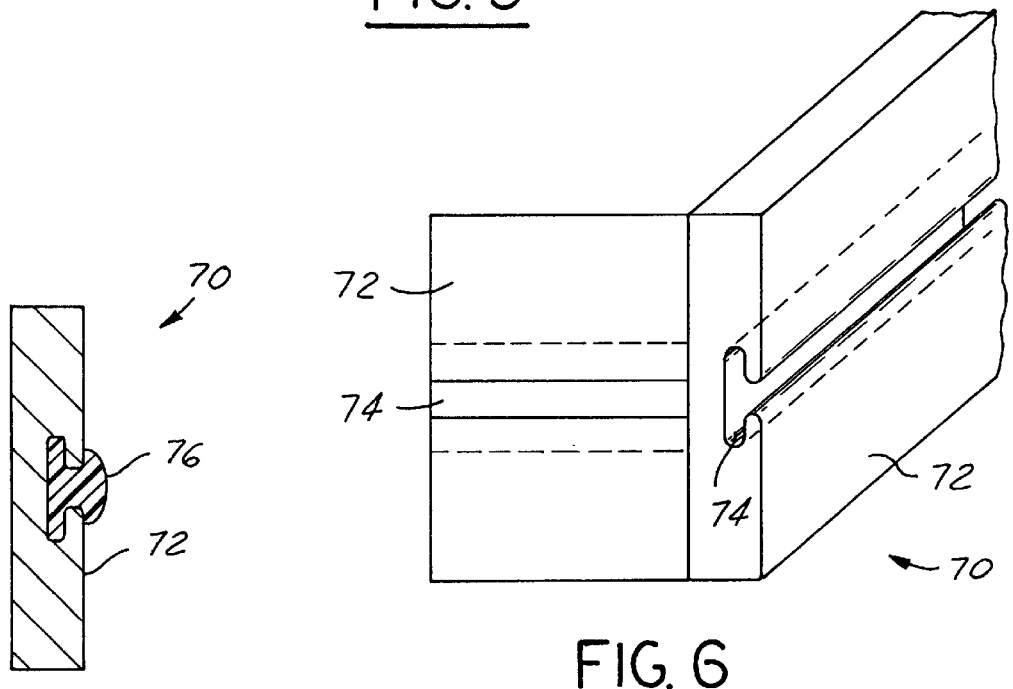
FIG. 6
FIG. 7
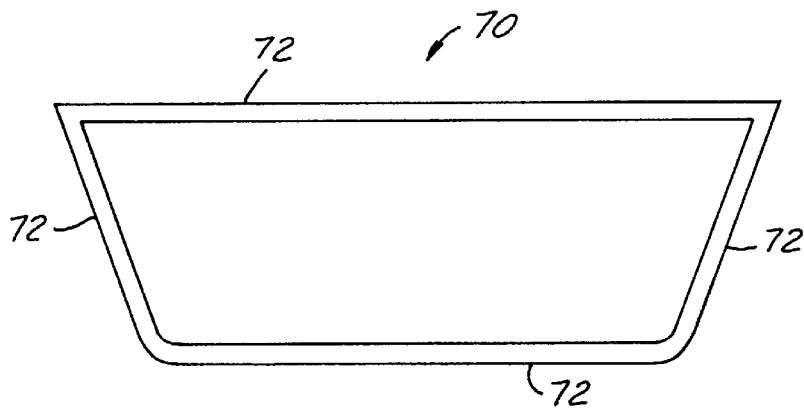
FIG. 8

STRUCTURAL REINFORCEMENTS

TECHNICAL FIELD

The present invention relates generally to the reinforcement of hollow structures and more specifically to the use of rigid reinforcements which utilize expandable resins.

BACKGROUND OF THE INVENTION

There has been an increase in the need for selective reinforcement of automotive structures in order to meet various government test standards. To that end, structural foams and carriers have been developed for the purpose of reinforcing specific locations in vehicles. The primary focus of these reinforcements is to add strength or stiffness to a structure.

As will be appreciated by those skilled in the art, the three factors of greatest general importance in the evaluation of reinforcement effectiveness are stiffness, weight, and cost. With most prior art techniques, increasing stiffness results in a corresponding penalty of weight increase and/or cost increase. For example, while using thicker gages of metal increases strength, it results in an unwanted increase in weight. Similarly, the use of exotic high-strength alloys is effective to increase strength, but this adds considerably to the cost of the vehicle. Finally, it will be recognized that the cost of resins is also a concern and thus structural foams must be used sparingly.

Another concern in the use of structural foams is the problem associated with fully curing material that is very thick. That is, in some prior art applications the materials required to satisfactorily reinforce are so thick that it is difficult to achieve full cure. Therefore, it will be recognized that techniques for reinforcing hollow structures which do not cause a substantial weight and cost or curing problems have the potential to provide significant advantages.

It is therefore an object of the present invention to provide a structural reinforcement which utilizes structural foam in a manner which conserves resin.

It is a further object of the invention to provide such a reinforcement which can be fully cured in a short time.

It is still a further object to provide a low-cost, light-weight structural reinforcement which provides significant strength and stiffness to the reinforced region.

It is still a further object to provide a structural reinforcement which can be transported easily to the site of installation.

SUMMARY OF THE INVENTION

In one aspect the present invention provides a keyed reinforcing member having a rigid body and an attached uncured resin portion. The rigid body includes a surface having a geometry that mates with the uncured resin to form a purely mechanical interlock between the rigid body and the resin. In one aspect the rigid member has an interlocking channel in which a strip of uncured resin is disposed. In one aspect the rigid member is linear, in other applications the member is non-linear with the resin strip being disposed circumferentially. In still another aspect the rigid member has attachment sites and locator pins which facilitate its location and attachment to the hollow structural body to be reinforced.

In another aspect the present invention provides a method of reinforcing a structure comprising the steps of providing a rigid member having a surface adapted to receive and mechanically retain an uncured resin body having a preselected shape. An uncured resin body having the mating geometry is inserted in the interlocking portion of the rigid member. The composite keyed reinforcement is then placed in the appropriate location of the structural body to be reinforced. The composite keyed reinforcement is then heated to a temperature sufficient to foam (expand) and cure the resin. Typically, the foam will then bond to the surrounding structural body.

Thus, the invention provides a way to reduce cost, improve stiffness, and increase the possibility of achieving full cure of the structural foam all through the use of a composite construction. The keying of the surface of the reinforcement member permits uncured resin to be applied such that mechanical interlocking between the member and the applied uncured resin occurs. This interlocking permits the resin to be positioned on the reinforcement member without the necessity of heating the reinforcement member, using a secondary adhesive, heating the uncured structural foam, or using a pressure sensitive uncured structural foam. In addition to processing ease, the keyed surface produces a structure that is strongly resistant to damage during shipping or handling in an assembly plant. In one aspect the primary uncured heat expandable material attached to the keyed reinforcing member is not pressure sensitive. This enables packaging such that adjacent preformed parts do not adhere to each other during shipping (i.e. the material does not behave as a pressure sensitive adhesive).

These features and others will be more fully explained herein in connection with the drawings.

BRIEF DESCRIPTION OF THE DRAWINGS

FIG. 5 is a cross section of a linear keyed reinforcement in another embodiment.

FIG. 6 is a perspective view of a portion of a non-linear keyed reinforcement in one aspect of the invention.

FIG. 7 is a cross section along lines 7—7 of FIG. 6 but with the resin strip inserted into the channel.

FIG. 8 is a plan view of the complete ring structure partially depicted in FIG. 6.

DESCRIPTION

Figure 1:
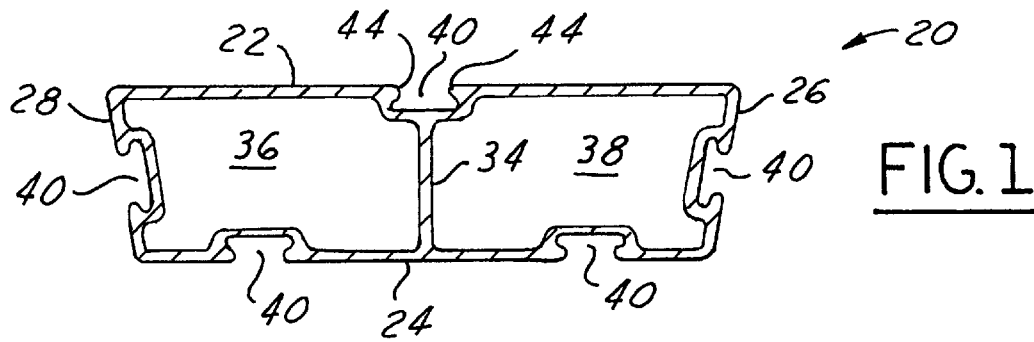
FIG. 1 is a cross sectional view of a rigid linear member of the keyed reinforcement of the present invention, prior to attachment of the resin strip.
Figure 2:
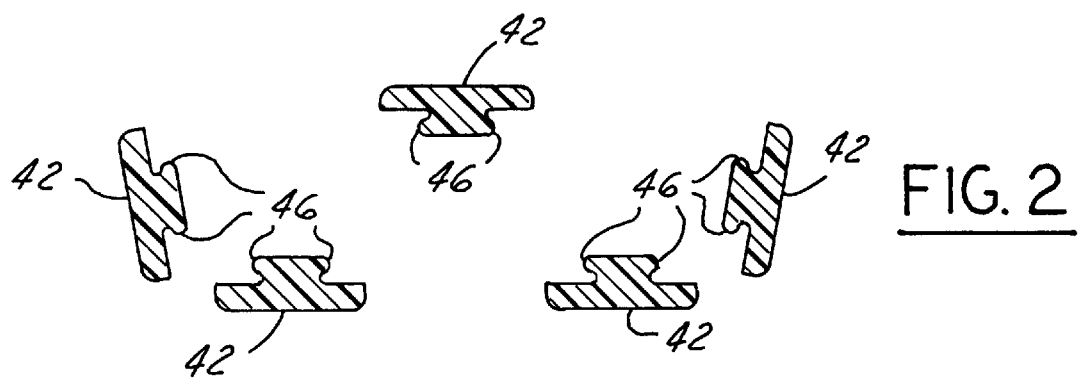
FIG. 2 is a cross section of a group of resin strips prior to insertion into the linear member of FIG. 1.

Referring now to FIGS. 1 through 4 of the drawings, multi-walled keyed member 20 is depicted as a linear extrusion having opposed walls 22, 24 and opposed walls 26, 28. Keyed member 20 serves not only to provide stiffness and strength to composite structural reinforcement member 30 (FIG. 3), but also as a mechanically interlocking carrier for thermally expandable resin strips 42. Keyed member 20 may be formed of a number of materials such as aluminum, light-weight steel and high-strength plastics. Most preferably, keyed member 20 is an aluminum extrusion, but can also be done effectively using injection molded, compression molded, blow molded, extruded, or rotational molded plastic or stamped or roll formed steel as well as other forming methods known to those skilled in the art of material use and forming. In this particular embodiment, keyed member 20 has an internal partition or wall 34 which defines two chambers, 36 and 38. Partition 34 provides additional strength and rigidity to member 20.

Figure 3:
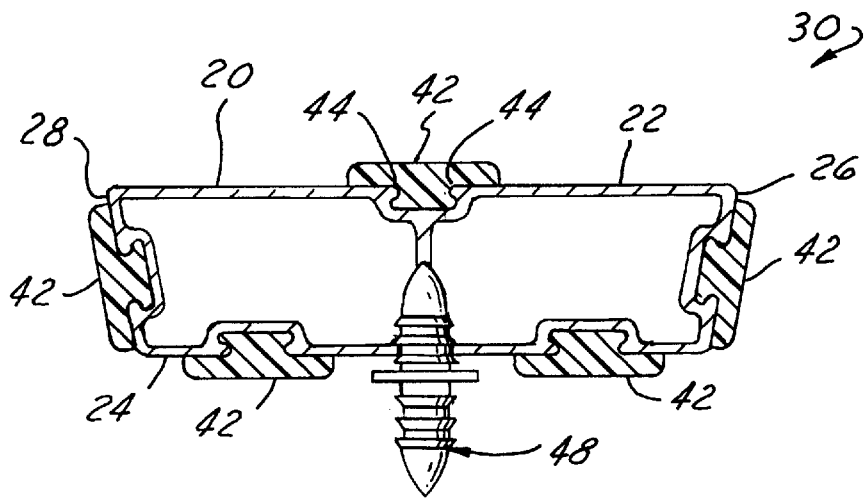
FIG. 3 is a cross sectional view of keyed reinforcement depicted in FIG. 1 after attachment of the resin strips of FIG. 1 and with insertion of a locator pin.
Figure 4:
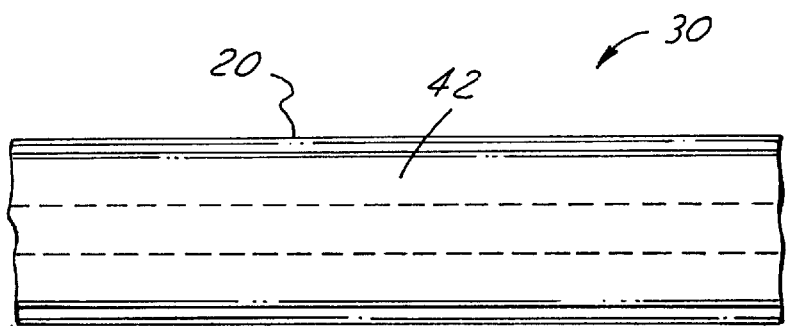
FIG. 4 is a side view of the keyed reinforcement member depicted in FIG. 1 of the drawings.

In the embodiment of FIGS. 1–4 each wall of keyed member 20 is provided with at least one channel 40 which is adapted to retain one resin strip 42. In more detail, and referring now to FIG. 1 of the drawings, wall 22 of keyed member 20 has channel 40 which will generally be coextensive along the entire length of keyed member 20. In this particular embodiment channel 40 is provided with lips or flanges 44 which extend partially over the opening or cavity of channel 40. As shown in FIG. 3, resin strips 42 have a shape which mates with channels 40 to provide a mechanical interlock as shown best in FIG. 3 of the drawings. It is to be understood that the precise mating shapes or geometries of the keyed member and the interlocking strip are not critical to the practice of the invention. It is important, however, that the two (member 20 and strips 42) have shapes which achieve the desired mechanical interlock, i.e. resin strips 42 are held in place by member 20 without the need for an adhesive bond or external additional locking parts. Thus, in the example shown in FIGS. 2 and 3 of the drawings lower edges 46 of resin strips 42 extend to engage lips 44 of channels 40. In FIG. 4 of the drawings, the linear nature of keyed member 20 and strip 42 are shown more clearly. It will be appreciated that strips 42 (which will also preferably be extruded) can be easily slipped into channels 40 for assembly of composite reinforcement structure 30 or may be formed in place as will be more fully described herein.

In order to locate composite reinforcement 30 in a structure to be reinforced, such as a motor vehicle body, and referring now to FIG. 3 of the drawings locator pin 48 may be provided. The nature of locator pins will be well known to those skilled in the art. In addition, in the most preferred embodiment of the invention at least two walls of keyed member 20 (in terms of area) are each at least 25% covered (this is total coverage and coverage may be interrupted) by their respective resin strips.

Referring now to FIG. 5 of the drawings in another embodiment composite reinforcement 50 has keyed member 52 with a central web 54 that forms channels 56 in which resin strips 58 are mechanically held in T-shaped locking configuration. This illustrates the variable nature of the interlocking surfaces of the keyed member and the resin strips; here, strip 58 has a convex surface 60 that is received in a concave depression 62. As in the previously described embodiment strips 64 are provided such that all sides of keyed member 52 have an associated resin strip. Locator pin 66 is also shown.

The construction of the present invention enables a number of different options for installation in a hollow structural part of a motor vehicle. One possibility is to attach end caps (not shown) to the reinforcing structure. These end caps may have an integral fastener or be spring loaded to enable installation and positioning in a vehicle. Another option is to form a part that has the near net shape of the structure that it is intended to reinforce such that when installed into a hollow cavity it becomes trapped and is thereby positioned. This would typically be a vehicle area that requires a reinforcement that is not linear and involves laying a part into a partial cavity that is later capped with another piece of sheet metal. An additional method of installation is to apply a pressure sensitive adhesive to some surface of the composite reinforcing structure. Depending on goals of the reinforcement, the pressure sensitive adhesive may or may not also have structural characteristics following cure.

As stated above, in one embodiment of the invention composite keyed reinforcement 30 is linear; that is, preferably its length is at least twice its width or height. In another preferred embodiment, however, and referring now to FIGS. 6 through 8 of the drawings, composite reinforcement 70 is in the nature of a ring or continuous wall structure. Each face 72 has a channel 74 into which a resin strip 76 is disposed by mechanical interlock as in the previously described embodiments. (In addition, as best shown in FIG. 7, in a preferred embodiment of the invention at least 50% by weight of resin strip 76 resides outside of channel 74 although it is not necessary that any material reside outside in some applications.) Accordingly, the structures of FIGS. 1–5 would typically be used if increased bending resistance is required. If reinforcement for so-called breathing or oil canning is required, circumferential material of FIGS. 6 through may be used.

Resin strips 42, 64 and 76 are thermally expandable. That is, upon the application of heat they will expand, typically by a foaming reaction, and preferably to at least 50% the volume of the unexpanded state, but more preferably twice (the unexpanded state being depicted in the drawings). In a preferred embodiment, the resin used to form the resin strips is an epoxy-based material.

Resin preferably forms from about 5% to about 75% by weight and more preferably from about 15% to 65% by weight of the resin strip. Filler preferably forms from about 0% to about 70% by weight and more preferably from about 20% to about 50% by weight of the resin strip. Blowing agent preferably forms from about 0% to about 10% by weight and more preferably from about 0.2% to 5% by weight of the resin strip. Curing agent preferably forms from about 0% to about 10% by weight and more preferably from about 0.5% to 5% by weight of the resin strip. Accelerator preferably forms from about 0% to about 10% by weight and more preferably from about 0.3% to 5% by weight of the resin strip. One preferred formulation is set forth in Table I below.

| Ingredient | % by Weight |
| --- | --- |
| Epoxy Resin | 15% to 65% |
| Ethylene Copolymer | 0% to 20% |
| Blowing Agent | 0.2% to 5% |
| Curing Agent | 0.5% to 5% |
| Accelerator | 0.3% to 5% |
| Filler | 20% to 50% |

As stated, the heat expandable material is most preferably a heat-activated, substantially epoxy-based material. However, other suitable materials may also be suitable. These include polyolefin materials, copolymers and terpolymers with at least one monomer type an alpha-olefin, phenol/formaldehyde materials, phenoxy materials, polyurethane materials with a high glass transition and others. In general the desired characteristics of this heat expandable material will be high stiffness, high strength, high glass transition temperature, good corrosion resistance, ability to adhere to contaminated metallic and polymer surfaces, fast cure upon activation, good handing characteristics, low cured density, low cost, and long shelf life.

As stated, composite keyed reinforcement part 30 is most preferably intended to be placed in a hollow vehicle cavity for the purpose of structural reinforcement. When the vehicle is heated, the heat expandable material (structural foam) expands to contact the surface of the hollow cavity that it is intended to reinforce. It is not necessary that the space between the member and the inner surface of the hollow cavity or other surface being reinforced be fully filled with expanded heat expandable material for substantial reinforcement to occur. If full filling is required, it is possible to space the distance between pieces of uncured heat expandable material and/or adjust the quantity of heat expandable material such that the heat expandable material knits together during the expansion process.

A particular benefit of the present invention is that it permits large sections to be reinforced with full confidence that the structural foam material will fully cure. Because the material must be heated to cure, it is important that full cure occur to obtain optimum properties. If very large sections are filled with structural foam alone, then the difficulty of obtaining sufficient heat transfer through the material can be difficult. Use of a keyed composite reinforcing member greatly increases the probability that full cure will occur. This is possible both because it permits the possibility of using less heat activated foam and the rigid reinforcement provides a heat transfer conduit to the inner surface of the heat activated material. An additional benefit is that a reinforcement with less weight and lower cost can be provided for certain design types. A further additional benefit is that it permits the possibility of producing a part that is highly resistant to damage during transport owing to the support that the keyed reinforcing member provides to the heat expandable material.

Keyed reinforcing member 20 can be produced in many different ways which facilitates production of a keyed indentation that permits mechanical interlocking. It is possible to make a keyed reinforcing member by aluminum extrusion, steel roll forming, pultruded polymer composites, extruded polymers, blow molded polymers, thermoformed extruded polymers, and compression molded powder metals. Many other methods can be envisioned as well. The type of reinforcement is dictated by desired part shape, performance characteristics, and cost.

Composite reinforcing structure 30 may be constructed by dispensing heat activated expandable material onto the keyed reinforcing member using an extruder, including an extruder that is articulated by a robot. This process relies on the extruder being positioned such that molten heat expandable material is dispensed into the keyed section of the keyed reinforcement member. Upon cooling, the heat expandable material will stiffen and resist deformation while being transported. Upon sufficient reheating (a temperature necessarily higher than the temperature used to shape the heat expandable material), the heat expandable material will be activated such that it will expand and cure in the hollow vehicle cavity and thereby provide the desired reinforcement. A particularly preferred way of dispensing material onto a keyed reinforcing member is to use a robot articulated extruder to press the molten heat expandable material into the keyed sections. An additional method is to insert injection mold this material onto the keyed reinforcing structure. Another way of constructing this kind of reinforcement is to separately extrude the heat expandable material into a shape that mimics the section of a keyed location and then slide or snap the heat expandable material into the keyed section of a keyed reinforcing member. A further additional way of making the composite construction is to press molten of deformable heat expandable material into the keyed section of the reinforcing member.

We claim:

1. A reinforcement member for structurally reinforcing a hollow member, said reinforcement member comprising:

a member having a body, said body defining a channel for receiving a strip of uncured thermally expandable resin therein, said body further defining a mechanical interlocking means at said channel; and an uncured thermally expandable resin strip disposed in said channel, said uncured thermally expandable resin strip having a surface which is shaped to mate with said channel such that said mechanical interlocking means mechanically retains said uncured thermally expandable resin strip in said channel.

2. The reinforcement member recited in claim 1, wherein said body, said channel and said uncured thermally expandable resin strip are linear.

3. The reinforcement member recited in claim 1, wherein said body, said channel and said uncured thermally expandable resin strip are non-linear.

4. The reinforcement member recited in claim 1, wherein said uncured thermally expandable resin strip is epoxy-based.

5. The reinforcement member recited in claim 1, further including at least one locator means for locating said reinforcement member in a hollow structure.

6. The reinforcement member recited in claim 5, wherein said locator means is a post.

7. The reinforcement member recited in claim 1, wherein said interlocking means is a T-shaped slot.

8. A reinforcement member for structurally reinforcing a hollow member, said reinforcement member comprising:

a metallic or high-strength thermoplastic member defining a channel for receiving uncured thermally expandable epoxy-based resin therein, said metallic member further defining a mechanical interlocking means at said channel; and an uncured thermally expandable epoxy-based resin disposed in said channel, said uncured thermally expandable epoxy-based resin having a surface which is shaped to mate with said channel such that said mechanical interlocking means mechanically retains said uncured thermally expandable epoxy-based resin in said channel.

9. The reinforcement member recited in claim 8, wherein said metallic member is linear or contains curvature (non-linear).

10. The reinforcement member recited in claim 8, wherein said metallic member is a ring.

11. The reinforcement member recited in claim 8, further including at least one locator means for locating said reinforcement member in a hollow structure.

12. The reinforcement member recited in claim 11, wherein said locator means is a post.

13. The reinforcement member recited in claim 8, wherein said interlocking means is a T-shaped slot.

14. A reinforcement member for structurally reinforcing a hollow member, said reinforcement member comprising:

a member having a body, said body defining a channel for receiving a strip of uncured thermally expandable resin therein, said body further defining a mechanical interlocking means at said channel; and an uncured thermally expandable resin strip disposed in said channel, said uncured thermally expandable resin strip having a surface which is shaped to mate with said channel such that said mechanical interlocking means mechanically retains said uncured thermally expandable resin strip in said channel, said uncured thermally expandable resin strip being retained in said channel solely by said mechanical interlocking means.

15. The reinforcement member recited in claim 14, wherein said body, said channel and said uncured thermally expandable resin strip are linear.

16. The reinforcement member recited in claim 14, wherein said body, said channel and said uncured thermally expandable resin strip are non-linear.

17. The reinforcement member recited in claim 14, wherein said uncured thermally expandable resin strip is epoxy-based.

18. The reinforcement member recited in claim 14, further including at least one locator means for locating said reinforcement member in a hollow structure.

19. The reinforcement member recited in claim 18, wherein said locator means is a post.

20. The reinforcement member recited in claim 14, wherein said interlocking means is a T-shaped slot.

* * * * *

UNITED STATES PATENT AND TRADEMARK OFFICE
Certificate

Patent No. 6,131,897            Patented: October 17, 2000

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: William J. Barz, St. Clair, MI (US); Michael J. Czaplicki, Rochester, MI (US); Jon Riley, Farmington, MI (US); and Henry E. Richardson, Washington, MI (US).

Signed and Sealed this Eighteenth Day of July 2006.

CARL FRIEDMAN
*Supervisory Patent Examiner*
Art Unit 3635